Figure 2:
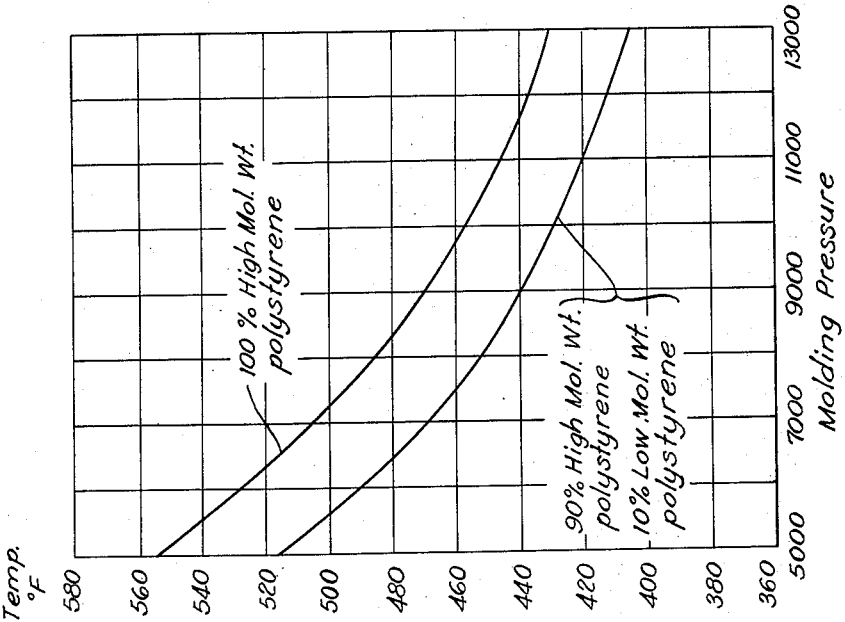

Dec. 16, 1958  R. M. PRICE ET AL  2,864,802
MOLDING COMPOSITIONS OF HIGH MOLECULAR WEIGHT
AND LOW MOLECULAR WEIGHT POLYMERS
Filed Nov. 28, 1955

INVENTORS.
Raymond M. Price
Lewis J. Young
Bernard H. Tubbs
Robert E. Lee

BY Griswold & Burdick
ATTORNEYS

2,864,802

MOLDING COMPOSITIONS OF HIGH MOLECULAR WEIGHT AND LOW MOLECULAR WEIGHT POLYMERS

Raymond M. Price, Midland, Lewis J. Young, Sanford, Bernard H. Tubbs, Clare, and Robert E. Lee, Midland, Mich., assignors to The Dow Chemical Company, Midland, Mich., a corporation of Delaware Application November 28, 1955, Serial No. 549,292

6 Claims. (Cl. 260—45.5)

This invention concerns certain new compositions which are intimate mixtures of high molecular weight and low molecular weight thermoplastic alkenyl aromatic resins. It relates more particularly to a method of increasing the flow rate during molding at elevated temperatures and pressures of a normally solid thermoplastic alkenyl aromatic resin of high molecular weight which method comprises forming compositions which are uniform mixtures of certain low molecular weight alkenyl aromatic resins and high molecular weight alkenyl aromatic resins.

U. S. Patent No. 2,401,266 makes electrical insulating compositions that comprise a mixture of from about 20 to 50 percent by weight of polystyrene having a mean molecular weight of about 80,000 and from 50 to 80 percent of polymerized alpha-methyl styrene having a viscosity of between 100 and 2000 centistokes at 100° F. as plasticizer.

U. S. Patent No. 2,454,851 makes electrical insulating material which comprises a uniform mixture of from 50 to 70 percent by weight of polystyrene having a molecular weight between 60,000 and 150,000, from 18 to 30 percent of polymerized styrene having a molecular weight of from 6,000 to 30,000 and from 10 to 20 percent of another plasticizer such as isoamylnaphthalene, phenanthrene, $\beta$-naphthyl ethyl ether, octahydrophenanthrene, etc.

Such plasticized polystyrene compositions are satisfactory for many electrical insulating applications, e. g. for insulation around conductors in cables, where a material is desired which when heated is soft enough to flow into the place where it is wanted, and when cooled to ordinary temperatures, it hardens, but the compositions do not possess properties such as good tensile strength, high heat distortion temperature or resistance to shrinkage upon heating at elevated temperatures, e. g. at temperatures of from 80° to 100° C. which are desired for the manufacture of molded plastic articles.

Polystyrene and other thermoplastic alkenyl aromatic resins are often undesirably resistant to rapid flow during molding at the elevated temperatures and pressures employed in usual compression or injection molding operations or by extrusion methods and difficulties have been encountered in producing accurate moldings or extrusions at the rapid rates required in commercial operations. It is known that the rates of flow during molding may readily be increased by incorporating any of a variety of well known plasticizing agents with the resin prior to molding. However, most plasticizers when added in amount sufficient for the purpose, seriously impair one or more of the properties of the molded product. For instance, the addition of 10 percent by weight or more of a usual plasticizer or flow agent such as white mineral oil, butyl stearate, dibutyl phthalate, etc., results in a pronounced decrease in the tensile strength and a substantial lowering of the heat distortion temperature of the molded article.

The heat distortion temperature of thermoplastic resins such as polystyrene or copolymers of styrene and one or more other polymerizable monoethylenically unsaturated vinyl or vinylidene compounds, is usually determined by a procedure similar to that described in A. S. T. M. D–648–45T or a procedure of Heirholzer and Boyer, see A. S. T. M. Bulletin No. 134 of May 1945. The heat distortion temperature of a thermoplastic resin is recognized in the art as a measure of the practical heat stability of the resin or of molded articles made of the resin against dimensional change upon heating the same at elevated temperatures. Most thermoplastic resins are characterized by a second order transition temperature below which they are rigid, brittle, dimensionally stable and free from cold flow, but above which temperature they are tough, rubbery and subject to flow. The second order transition temperature for polystyrene has heretofore been indicated to coincide with the heat distortion temperature, see "Styrene, Its Polymers, Copolymers and Derivatives," page 509, Reinhold Publishing Corporation, New York, N. Y. (1952). Although the teaching that the second order transition temperature and the heat distortion temperature for polystyrene are the same is correct for polystyrene having an average molecular weight of about 80,000 or greater as determined by the scattering of light, such as molding grade polystyrene, the normally solid thermoplastic alkenyl aromatic resins, e. g. polystyrene, having an average molecular weight lower than 80,000, say from 10,000 to 60,000, have second order transition temperatures which are substantially lower than the heat distortion temperature determined in accordance with the aforementioned test procedures.

It has now been discovered that the normally solid thermoplastic alkenyl aromatic resins of low molecular weight being subject to flow at temperatures above their second order transition temperature and below their heat distortion temperature are eminently suitable for incorporating with thermoplastic alkenyl aromatic resins of high molecular weight for increasing the flow rate of the high molecular weight resin during molding at elevated temperatures and pressures without appreciably reducing the heat distortion temperature of the molded article below the heat distortion temperature of the high molecular weight resin alone.

Accordingly, it is a primary object of the invention to provide a method of increasing the flow rate during molding at elevated temperatures and pressures of a normally solid thermoplastic alkenyl aromatic resin of high molecular weight without appreciably reducing the heat distortion temperature of the molded article below the heat distortion temperature of the resin alone. Another object is to provide molding compositions comprised essentially of a hard thermoplastic alkenyl aromatic resin of high molecular weight and a minor but effective proportion of a normally solid alkenyl aromatic resin compatible therewith and of relatively low molecular weight to increase the flow rate during molding at elevated temperatures and pressures without appreciably changing the physical properties such as tensile strength, impact strength, percent elongation, hardness and heat distortion temperature of the molded article from those of the high molecular weight resin alone. Other and related objects may appear from the following description of the invention.

According to the invention, the rate of flow of a normally solid thermoplastic alkenyl aromatic resin of high molecular weight, e. g. polystyrene, having an average molecular weight of at least 140,000, preferably 200,000 or greater, as determined by the scattering of light (see J. Chem. Phys., vol. 18, pp. 830–893, 1950), during molding at elevated temperatures and pressures can readily be increased without appreciably reducing the heat distortion temperature of the molded article below that of the high molecular weight resin alone, by intimately incorporating with the high molecular weight resin a minor proportion, suitably from 2 to 40 percent by weight, of a normally solid thermoplastic alkenyl aromatic resin of relatively low molecular weight, which resin is compatible therewith, is substantially free from volatile ingredients, has a molecular weight not more than one-third as great as the molecular weight of the high molecular weight resin and a second order transition temperature at least as high as 45° C. and not more than 5° C. above the second order transition temperature of the high molecular weight resin.

It is important that the high molecular weight and the low molecular weight alkenyl aromatic resin starting materials and the final composition or product be free or substantially free from volatile ingredients or additives such as plasticizers, i. e. contain not more than 3, preferably not more than 2, percent by weight of such ingredients.

The thermoplastic alkenyl aromatic resins of high molecular weight to be employed in preparing the compositions are the normally hard solid polymers and copolymers of one or more monovinyl aromatic hydrocarbons of the benzene series such as styrene, vinyltoluene, vinylxylene, ethylvinylbenzene, ethylvinyltoluene, isopropylstyrene, etc.; copolymers of at least 60, preferably from 60 to 85, percent by weight of at least one such monovinyl aromatic hydrocarbon and not more than 40, suitably from 40 to 15, percent of a monoalkenyl aromatic hydrocarbon of the benzene series having a single isopropenyl radical directly attached to a carbon atom of the benzene nucleus, e. g. alpha-methyl styrene, alpha-ethyl styrene or para-methyl-alpha-methyl styrene; and resinous compositions comprising a major proportion by weight of at least one such polymerized aromatic hydrocarbon of high molecular weight and a minor proportion, preferably from 2 to 40 percent by weight, of a rubbery elastomer such as natural rubber or a synthetic rubbery copolymer containing in chemically combined form from 40 to 80 percent by weight of butadiene and from 60 to 20 percent of styrene.

The resinous compositions of high molecular weight containing a minor proportion by weight of a rubbery elastomer such as natural or a synthetic rubber to be employed as starting material are suitably copolymers of from 85 to 98 percent by weight of one or more monovinyl aromatic hydrocarbons, e. g. styrene or vinyltoluene, and from 15 to 2 percent of the rubbery elastomer. Such copolymers can conveniently be prepared by procedure described in United States Patent No. 2,694,692. The high molecular weight resin starting material containing rubber can also be prepared by intimately incorporating a major proportion by weight of one or more of the aforementioned high molecular weight alkenyl aromatic resins with a minor proportion, preferably from 2 to 40 percent by weight, of the rubbery elastomer in usual ways, e. g. by compounding the heat-plastified ingredients with one another on rolls, a Banbury mixer or a plastics extruder to obtain a uniform composition.

Thermoplastic resinous polymers of high molecular weight of the alkenyl aromatic hydrocarbons can readily be prepared by polymerizing one or more of the monovinyl aromatic hydrocarbons or mixtures of the monovinyl aromatic hydrocarbons and a monoalkenyl aromatic hydrocarbon, e. g. alpha-methyl styrene, in the desired proportions, in usual ways such as by heating the monomers in bulk, i. e. in the substantial absence of an inert liquid medium. Polymers of monovinyl aromatic hydrocarbons can be prepared by procedure described in United States Patent No. 2,530,409. Copolymers of the monovinyl aromatic hydrocarbons and a monoalkenyl aromatic hydrocarbon, e. g. copolymers of styrene and alpha-methyl styrene, can be prepared by procedure described in United States Patent No. 2,638,465. The alkenyl aromatic resins of high molecular weight are usually devolatilized by heating the resin to its melting temperature or above under reduced pressure to vaporize and remove volatile ingredients, so as to obtain a polymeric material which is free or substantially free, i. e. contains not more than 3, preferably not more than 2, percent by weight of volatile ingredients such as dimers, trimers, or tetramers which volatile ingredients tend to lower the heat distortion temperature of the polymer.

The alkenyl aromatic resins of low molecular weight to be employed as starting materials for increasing the flow rate of the normally solid high molecular weight alkenyl aromatic resins during molding at elevated temperatures and pressures are the homopolymers and copolymers of one or more monoalkenyl aromatic hydrocarbons of the benzene series having a single polymerizable group of the formula $CH_2=CR-$ wherein R represents a member of the group consisting of hydrogen, the methyl and ethyl radicals, directly attached to a carbon atom of the benzene nucleus. Examples of suitable monoalkenyl aromatic hydrocarbons are styrene, vinyltoluene, vinylxylene, ethylvinylbenzene, isopropylstyrene, ethylvinyltoluene, alpha-methyl styrene, alpha-ethyl styrene or para-methyl-alpha-methyl styrene.

The low molecular weight polymers of the alkenyl aromatic hydrocarbons can be prepared in usual ways such as by polymerizing the monomers in an inert liquid organic solvent and in the presence or absence of a catalyst, or by heating the monomers in bulk at elevated temperatures and pressures. The molecular weight of the low molecular weight polymers can be controlled by varying the proportion of solvent employed or the temperature at which the polymerization is carried out. Usually, an increase in the proportion of solvent employed results in the formation of a polymer of lower molecular weight, under otherwise similar polymerization conditions, and an increase in the polymerization temperature results in the formation of a polymer of lower molecular weight. More specifically, the low molecular weight polymers of monovinyl aromatic hydrocarbons, e. g. styrene or vinyltoluene, can readily be prepared by heating the monomers in bulk at temperatures between about 130° and 320° C. under pressure. The low molecular weight homopolymers of, and copolymers of two or more, monoalkenyl aromatic hydrocarbons such as alpha-methyl styrene, alpha-ethyl styrene or para-methyl-alpha-methyl styrene can conveniently be prepared by polymerizing the monomers in an inert organic solvent such as chlorobenzene, ethylbenzene, toluene or isopropylbenzene in the presence of a bleaching earth or clay as catalyst at temperatures between —70° C. and about 90° C. or above. Copolymers of low molecular weight can be prepared from mixtures of the monovinyl aromatic hydrocarbons and monoalkenyl aromatic hydrocarbons by the procedures just mentioned. The low molecular weight copolymers containing a major proportion by weight of a monovinyl aromatic hydrocarbon, e. g. styrene, and a minor proportion of an alkenyl aromatic hydrocarbon such as alpha-methyl styrene are usually prepared by heating a mixture of the monomers in bulk at elevated temperatures between 130° and 320° C. The low molecular weight copolymers of a major proportion by weight of an alkenyl aromatic hydrocarbon, e. g. alpha-methyl styrene, and a minor proportion of a monovinyl aromatic hydrocarbon such as styrene can be prepared by polymerizing such a mixture of the monomers in an inert solvent in the presence of a catalyst at temperatures of from —70° to about 90° C.

It is important that the low molecular weight alkenyl aromatic resin be free or substantially free from volatile ingredients, i. e. contain not more than 3, preferably not more than 2 percent by weight of volatile ingredients, have a second order transition temperature at least as high as 45° C., which second order transition temperature may be as high or up to 5° C. higher than the second order transition temperature of the high molecular weight alkenyl aromatic resin with which it is incorporated, and a molecular weight not greater than one-third as great as the average molecular weight of the high molecular weight alkenyl aromatic resin. For example, when employing polystyrene having an average molecular weight of about 180,000 as the high molecular weight resin starting material, suitable low molecular weight alkenyl aromatic resins to be incorporated therewith for increasing the flow rate during molding at elevated temperatures and pressures of the high molecular weight alkenyl aromatic resin are the low molecular weight resins of polymerized aromatic hydrocarbons such as styrene, vinyltoluene, alpha-methyl styrene or copolymers of styrene and alpha-methyl styrene, which polymers are substantially free from volatile ingredients, i. e. contain not more than 3, preferably not more than 2, percent by weight of volatile ingredients capable of being vaporized and removed by heating the polymer at a temperature of 213° C. at one millimeter absolute pressure for a period of 25 minutes, and which low molecular weight polymers have average molecular weights between about 60,000 and a lower value corresponding to a second order transition temperature for the polymer at least as high as 45° C.

The proportions of the high molecular weight resin and the low molecular weight resin relative to one another can be varied widely, depending for the most part upon the difference between the average molecular weight of the low molecular resin and the average molecular weight of the high molecular weight resin with which it is intimately incorporated. In general, the low molecular weight polymers of monovinyl aromatic hydrocarbons such as polystyrene or polyvinyltoluene having average molecular weights between about 10,000 and 40,000 and second order transition temperatures between about 45° and 65° C. can be employed in amounts of from 2 to 20, preferably from 5 to 15, percent by weight of the sum of the weights of the low molecular weight resin and the high molecular weight resin used. The low molecular weight polymers such as polystyrene or polyvinyltoluene having average molecular weights of 45,000 or above, e. g. from 45,000 to 90,000, can be employed in amounts of from 2 to 40, preferably from 5 to 15, percent by weight of the final composition. The low molecular weight polymers of monovinyl aromatic hydrocarbons are preferably polymers having molecular weights of from 10,000 to 60,000. The low molecular weight resins of polymerized alkenyl aromatic hydrocarbons such as alpha-methyl styrene, alpha-ethyl styrene or para-methyl-alpha-methyl styrene, which resins have average molecular weights of at least 1000, preferably from 1000 to 6000, and second order transition temperatures at least as high as 45° C. and not more than 5° C. higher than the second order transition temperature of the high molecular weight resin with which it is incorporated, are usually employed in amounts of from 2 to 20, preferably from 5 to 15, percent by weight of the composition.

The effect of the low molecular weight resin for increasing the flow rate of the high molecular weight resin during molding at elevated temperatures and pressures becomes greater as the difference between the average molecular weight of the low molecular weight resin and the average molecular weight of the high molecular weight resin, with which it is incorporated, increases. More specifically, a small amount, e. g. 10 percent by weight, of polystyrene having an average molecular weight of about 20,000 when intimately incorporated with 90 percent by weight of polystyrene having an average molecular weight of 275,000 has an effect of increasing the flow rate of the high molecular weight polystyrene which is substantially equivalent to the increase in flow rate obtained by incorporating 40 percent by weight of polystyrene having an average molecular weight of about 80,000 with 60 percent by weight of the polystyrene of molecular weight of 275,000.

The compositions comprising the high molecular weight and the low molecular weight alkenyl aromatic resins intimately and uniformly incorporated with one another and which compositions have improved flow rates during molding at elevated temperatures and pressures over flow rates of the high molecular weight resins, alone, under otherwise similar molding conditions, can be prepared by intimately incorporating from 2 to 40, preferably from 5 to 15, percent by weight of the low molecular weight alkenyl aromatic resin with from 98 to 60, preferably from 95 to 85, percent of the high molecular weight resin.

The resins can be intimately incorporated with one another in any usual way. The resins can be heat-plastified and mechanically worked with one another on compounding rolls, a Banbury mixer or in a plastics extruder and at temperatures between about 140° and 280° C., preferably in the absence or substantial absence of air or oxygen. The resins can be dissolved or dispersed in an organic liquid such as benzene, toluene, xylene, ethylbenzene, ethyltoluene, etc., to form a solution or intimate dispersion containing the high molecular weight and the low molecular weight resins in the desired proportions, after which the solvent is removed in usual ways, e. g. by evaporation of the solvent at elevated temperatures and under reduced pressures. The compositions can be prepared by dissolving the low molecular weight polymer in monomer, e. g. dissolving low molecular weight polystyrene or polyvinyltoluene in monomeric styrene, in the desired proportions, then heating the solution to polymerize the monomer under conditions which form high molecular weight polymer such as by heating the solution in bulk or dispersed in an aqueous medium such as water or brine at temperatures between about 80° and 210° C. and at atmospheric or superatmospheric pressures.

The high molecular weight polymer and the low molecular weight polymer can conveniently be incorporated with one another by mixing or blending granules of the solid polymers in the desired proportions and feeding the mixture into a plastics extruder wherein it is heat-plastified and mechanically worked at temperatures between about 140° and 280° C. until a uniform composition is obtained, then is extruded, preferably devolatilized, and cooled and cut or ground to a granular form suitable for molding. In all such blending operations it is essential that the heat-plastified polymers be maintained or mechanically worked with one another under time and temperature conditions which do not result in any appreciable deterioration of the polymers, e. g. to form volatile ingredients such as monomers, dimers, trimers or tettramers, or polymers of lower molecular weight than either of the polymer starting materials, because such formation of by-product ingredients tends to result in lowering of the heat distortion temperature of the composition.

The efficiency of the effect of the low molecular weight polymer for increasing the flow rate of the high molecular weight polymer during molding at elevated temperatures and pressures, appears to be greatest when the high molecular weight polymer is caused to flow by application of an applied molding pressure, under conditions of high shearing stress.

The effect of the low molecular weight polymers for increasing the flow rate of the high molecular weight polymer during molding at elevated temperatures and pressures can readily be determined by observing the temperature at which the flow rate of the high molecular weight polymer alone is just sufficient to fill a given mold under application of a predetermined molding pressure in a stated period of time, and observing the temperature at which the flow rate of a composition consisting of an intimate homogeneous mixture of the high molecular weight polymer and a low molecular weight polymer is just sufficient to fill the mold under the same applied molding pressure and time. By such procedure one obtains a measure of the effect which results in an increase in flow rate of the high molecular weight polymer due to the low molecular weight polymer incorporated therewith, expressed in terms of lowered molding temperature. The temperature at which the flow rate of the material is just sufficient to completely fill a mold under given molding pressure and time conditions is herein referred to as the "flow temperature."

The flow temperature constitutes an indirect, but readily determined, measure of the flow rate during molding at elevated temperatures and pressures of a normally solid thermoplastic alkenyl aromatic resin. The difference between the flow temperature of a high molecular weight thermoplastic alkenyl aromatic resin alone, and the flow temperature of an intimate mixture of the high molecular weight resin and an alkenyl aromatic resin of low molecular weight, under similar conditions of molding pressure and time is a measure of the effect of the low molecular weight resin for increasing the flow rate of the high molecular weight resin during molding. The flow temperature becomes lower as the applied load or molding pressure is increased. At constant load, the flow temperature becomes lower with increase in efficiency of the effect of the low molecular weight resin, and becomes lower with increase in the proportion of the low molecular weight resin employed.

By varying the molding pressure applied to a given polymeric material and observing the flow temperature for different molding pressures one obtains a series of temperature values which can be plotted on coordinates of temperature versus applied molding pressure and a smooth curve drawn through the points to obtain a flow diagram for the polymer.

Figure 1:
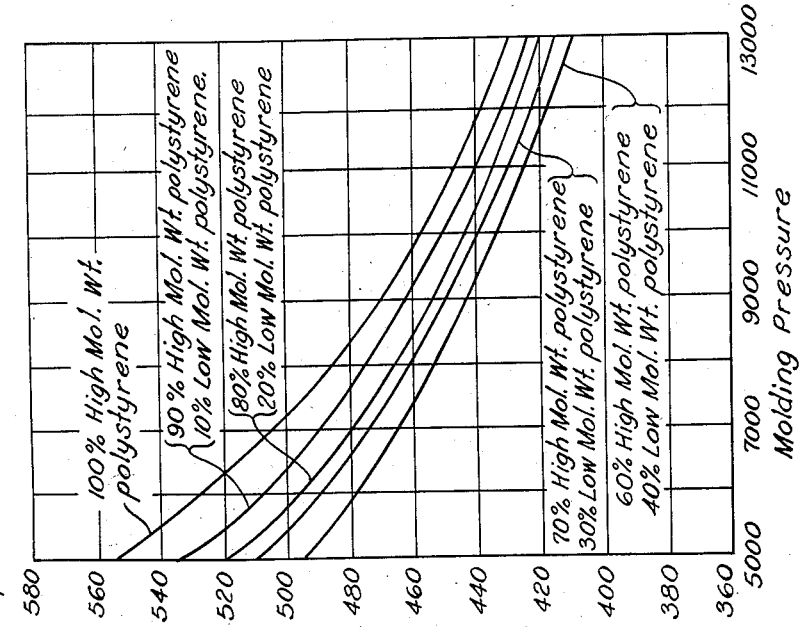

Figs. 1–2 of the drawing illustrate such flow diagrams and are more particularly hereinafter described with reference to the examples.

It may be mentioned that the effect of increasing the flow rate during molding at elevated temperatures and pressures of a high molecular weight thermoplastic resin due to intimately incorporating a small proportion of a low molecular weight alkenyl aromatic resin therewith, is more pronounced and results in greater improvement in the compositions when both the high molecular weight resin and the low molecular weight resin are composed of polymer molecules of relatively narrow molecular weight distribution. Best results are usually obtained when each of the polymeric starting materials has a narrow range of molecular weights and contains not more than two percent by weight of volatile ingredients, e. g. monomers, dimers, trimers or tetramers, and the polymeric starting materials are intimately incorporated with one another to form a homogeneous composition, suitably by heat-plastifying and mechanically working the ingredients with one another, under conditions which do not result in any appreciable deterioration of the polymers so as to obtain a final product containing volatile ingredients in amount not substantially greater than that of the starting materials.

This invention provides a method of readily increasing the flow rate during molding at elevated temperatures and pressures, e. g. at molding pressures of from 5,000 to 20,000 pounds per square inch gauge pressure, of a normally solid thermoplastic alkenyl aromatic resin without appreciably reducing the heat distortion temperature of the molded article below that of the high molecular weight resin alone. The invention provides a method for making molding compositions free or substantially free from liquid or volatile plasticizers and possessing good mechanical properties, which compositions are useful for a variety of applications in the home and industry.

The compositions comprising essentially a thermoplastic alkenyl aromatic resin of high molecular weight having uniformly incorporated therewith a normally solid alkenyl aromatic resin of relatively low molecular weight as the sole flow agent for increasing the flow rate during molding at elevated temperatures and pressures of the high molecular weight resin possess good mechanical properties such as tensile strength, impact strength, percent elongation, hardness and high heat distortion temperature which render the compositions suitable for use in the manufacture of molded articles which are useful in a variety of applications.

Small amounts of additives such as dyes, pigments, coloring agents, antioxidants, stabilizers, lubricants, mold release agents or plasticizers, if desired, can be incorporated with the compositions. Such agents when used in the compositions are usually employed in amounts corresponding to from 0.1 to 2 percent by weight of the final product, but such additives are not required in the invention.

The following examples illustrate ways in which the principle of the invention has been applied, but are not to be construed as limiting its scope.

EXAMPLE 1

In each of a series of experiments, a composition was prepared by intimately incorporating polystyrene of low molecular weight and polystyrene of high molecular weight with one another in proportions as stated in the following table. The low molecular weight polystyrene employed in the experiments contained 0.71 percent by weight of volatile ingredients and 3.5 percent of methanol soluble substances, had a viscosity characteristic of 6.1 centipoises (10 weight percent solution of the polystyrene in toluene at 25° C.), an average molecular weight of 82,000 (light scattering) and a second order transition temperature of 81.5° C. The procedure for determining the volatile ingredients was to heat a weighed portion of the polymer at a temperature of 213° C. at 1 millimeter absolute pressure for a period of 25 minutes, then cool and reweigh. The loss in weight represents volatile ingredients. The procedure for determining methanol soluble substances was to dissolve a weighed amount of the polymer in dioxane, precipitate the polymer in methyl alcohol, separate, wash and dry the precipitate and determine its weight. The loss in weight represents methanol soluble substances. It is to be noted that the percent methanol soluble substances determined by the test includes the percent of volatile ingredients. The average molecular weight of the polystyrene was obtained by determining the intrinsic viscosity for the polystyrene in toluene and reading the molecular weight from a graph plotted on coordinates of intrinsic viscosity versus molecular weight by light scattering (see Outer, Carr and Zimm, J. Chem. Phys., vol. 18, pp. 830–839, No. 6, June 1950). The procedure for determining the second order transition temperature was similar to that described in ASTM D864–45T. The high molecular weight polystyrene employed in the experiments contained 0.15 percent by weight of volatile ingredients, and contained 0.84 percent of methanol soluble substances, had a viscosity characteristic of 31.1 centipoises, an average molecular weight of 290,000, a second order transition temperature of 83° C. and a heat distortion temperature of 86° C. Both the high molecular weight polystyrene and the low molecular weight polystyrene employed in the experiments were composed of polymer molecules of narrow molecular weight distribution. In preparing the compositions the low and the high molecular weight polystyrenes were mixed in granular form in the desired proportions. The mixture was fed to a plastics extruder wherein it was heat-plastified at temperatures between 365° and 395° F., mechanically worked and extruded through a die, then cooled and cut to a granular form. Each mixture was passed through the plastics extruder two times. The product was injection molded to form test pieces 6.5 inches long having the end portions of 1/8 x 3/4 inch cross section by 1 1/8 inches long tapering to a mid-portion of 1/8 x 1/2 inch cross section by 3 inches long. The test pieces were molded on a standard plastics injection molding machine having a tunnel capacity such that the polymer was heated therein for a period of time of about 200 seconds when the machine was operated on a 45 second molding cycle to form a test bar. The procedure for injection molding a test bar was to maintain the molding pressure applied to the plastic at a constant value, e. g. 5000 pounds per square inch, and change the temperature at which the polymer was heated until the flow rate of the plastic under the applied molding pressure was just sufficient to fill the mold in a period of 45 seconds. The flow temperature, i. e. the temperature at which the flow rate of the polymer was just sufficient to completely fill the mold under the applied load in a period of 45 seconds, was observed. The flow temperature was determined for molding test pieces of the composition at pressures of 5000, 7000, 9000, 11,000 and 13,000 pounds per square inch. Test pieces of the composition injection molded at 13,000 pounds per square inch were immersed in water at a temperature of 97° C. for a period of 30 minutes, then removed, allowed to cool to room temperature and measured to determined the amount of linear shrinkage upon heating at the elevated temperature. Other test pieces were injection molded under an applied molding pressure of 10,000 pounds per square inch and at a temperature of 25° F. above the flow temperature. These test pieces were used to determine the tensile strength and percent elongation values for the composition employing procedures similar to those described in ASTM D638–49T. The impact strength was determined by procedure similar to ASTM D256–47T. The heat distortion temperature was determined by procedure similar to that described by Heirholzer and Boyer, see ASTM Bull. No. 134 of May 1945, employing test bars of ⅛ x ½ inch cross section by 2½ inches long.

For purpose of showing the increase in flow rate of the high molecular weight polystyrene during molding due to incorporating the low molecular weight polystyrene therewith, and to minimize any effect which may have been caused by mechanical working of the heat-plastified polymer in the extruder, a portion of the batch of the high molecular weight polystyrene was fed to the plastics extruder and mechanically worked therein at temperatures between 390° and 395° F., then extruded, cooled and cut to a granular form. This material was injection molded to form test bars and to determine the flow temperature as described above. Table I identifies the compositions by giving the proportions of the high molecular weight and the low molecular weight polystyrene employed in preparing the same. The table gives the tensile strength values and the heat distortion temperature for the composition. The table also gives the percent of linear shrinkage of a test bar of the composition and also gives the flow temperature, i. e. the temperature at which the flow rate of the polymeric composition was just sufficient to fill the mold in a period of 45 seconds under an applied molding pressure as stated in the table.

polymer during molding at elevated temperatures and pressures. The difference between the flow temperature of the high molecular weight alkenyl aromatic resin alone, and the flow temperature of a composition of the high molecular weight resin and the low molecular weight resin under similar molding pressures is a measure of the effect of the low molecular weight resin for increasing the flow rate of the high molecular weight resin during molding. By plotting the flow temperature values versus molding pressure values given in the above Table I and drawing a smooth curve through the points, one obtains a flow diagram for the resin. Fig. 1 of the drawing shows the flow diagrams obtained for the resins given in Table I above. The flow temperature is lowered with increase in the proportion of the low molecular weight resin employed without appreciably reducing the heat distortion temperature of the composition below that of the high molecular weight polystyrene alone.

EXAMPLE 2

A charge of 1260 grams of granular polystyrene of high molecular weight similar to that employed in Example 1, was mixed with 140 grams of granular low molecular weight polystyrene. The low molecular weight polystyrene employed in the experiment contained 1.7 percent by weight of volatile ingredients and 30 percent of methanol soluble substances, had a viscosity characteristic of 1.7 centipoises, an average molecular weight of about 19,000 and a second order transition temperature of 46° C. The mixture of the granular polystyrenes was fed into a plastics extruder wherein it was heated at temperatures between 330° and 340° F., thoroughly blended and extruded through a die, then cooled and crushed to a granular form. The product was injection molded to form test pieces and to determine the flow temperatures at various molding pressures employing procedures similar to those employed in Example 1. The product had the properties:

Tensile strength _____ lbs./sq. in._ 5640
Elongation _____ percent__ 2.0
Notched impact strength_____ ft.-lbs__ 0.54
Heat distortion temperature_____° C__ 83

The flow temperature for the product under an applied load as stated below was as follows:

Molding pressure,                              Temperature,
 lbs./sq. in.:                                      ° F.
  5,000 _____ 515
  7,000 _____ 470
  9,000 _____ 445
 11,000 _____ 420
 13,000 _____ 405

Fig. 2 of the drawing shows a flow diagram for the composition. For purpose of comparison, a flow diagram

*Table I*

| Run No. | Starting Materials | | Product | | | | | | | | | |
|---|---|---|---|---|---|---|---|---|---|---|---|---|
| | | | | | | | | Molding Pressure | | | | |
| | High mol. wt. Polystyrene, percent | Low mol. wt. Polystyrene, percent | Tensile Strength, lbs./sq. in. | Elongation, percent | Notched Impact Strength, ft.-lbs. | Heat Distortion Temp., ° C. | Shrinkage in 30 min. at 97° C., percent | 5,000 p. s. i. | 7,000 p. s. i. | 9,000 p. s. i. | 11,000 p. s. i. | 13,000 p. s. i. |
| | | | | | | | | Temp., ° F. | Temp., ° F. | Temp., ° F. | Temp., ° F. | Temp., ° F. |
| 1 | 100 | 0 | 6,850 | 3.5 | 0.44 | 86 | ---------- | 555 | 505 | 470 | 445 | 430 |
| 2 | 90 | 10 | 6,880 | 3.0 | 0.47 | 86 | 3.94 | 535 | 490 | 465 | 440 | 425 |
| 3 | 80 | 20 | 6,540 | 2.6 | 0.45 | 85 | 4.47 | 520 | 480 | 450 | 435 | 420 |
| 4 | 70 | 30 | 6,000 | 2.2 | 0.42 | 85 | 4.26 | 510 | 475 | 450 | 430 | 415 |
| 5 | 60 | 40 | 5,700 | 2.0 | 0.43 | 86 | 4.47 | 495 | 465 | 445 | 425 | 410 |

The flow temperature constitutes an indirect, but readily determined, measure of the flow rate of the for the high molecular weight polystyrene alone, is included in Fig. 2 of the drawing. Thus, the difference between the curves of the flow diagrams shows the effect of incorporating 10 percent by weight of the low molecular weight polystyrene with 90 percent by weight of the high molecular weight polystyrene for increasing the flow rate of the high molecular weight polystyrene during molding at the applied molding pressure and time conditions, expressed in terms of lowered molding temperature.

EXAMPLE 3

Polystyrene of low molecular weight and similar to that described in Example 2, was dissolved in monomeric styrene to form a solution containing two percent by weight of the low molecular weight polystyrene. The solution was placed in a pressure resistant vessel and agitated and heated at temperatures between 135° and 145° C. under 80 pounds per square inch gauge pressure until a test portion of the solution withdrawn from the vessel showed it to contain 18.3 percent by weight of polymer. Thereafter, the material was removed from the vessel. The polymer was recovered by distilling off the monomeric styrene and heating the polymer at temperatures between 200° and 210° C. at an absolute pressure of 10 millimeters. The product contained 0.77 percent by weight of volatile ingredients, had a viscosity characteristic of 14.3 centipoises and an average molecular weight of 170,000. The product contained 11 percent by weight of the low molecular weight polystyrene starting material. The product was injection molded and tested employing procedures similar to those employed in Example 1. The product had the properties:

Tensile strength _____lbs./sq. in__ 5440
Elongation _____percent__ 2
Notched impact strength_____ft.-lbs__ 0.45
Heat distortion temperature_____° C__ 86

The flow temperature for the product under an applied molding pressure as stated below was as follows:

Molding pressure          Temperature,
  lbs./sq. in.:                     ° F.
    5000 _____ 490
    7000 _____ 455
    9000 _____ 430
    11,000 _____ 410
    13,000 _____ 400

EXAMPLE 4

In each of a series of experiments, a charge of 1120 grams of a batch of a granular copolymer of 95 percent by weight of styrene and 5 percent of a synthetic GR-S rubber containing in chemically combined form about 75 percent by weight of butadiene and 25 percent of styrene, which copolymer of styrene and rubber was of high molecular weight and had a heat distortion temperature of 74° C., was mixed with 280 grams of granular polystyrene of low molecular weight as identified in the following table. The mixture of the granular polymers was fed into a plastics extruder wherein it was heated and blended into a uniform composition at temperatures between 330° and 340° F., then extruded through a die, cooled and cut to a granular form suitable for molding. The composition was injection molded and tested as described in Example 1. Table II identifies the compositions by giving the proportions of the high molecular weight copolymer and the low molecular weight polystyrenes employed in preparing the same, and the properties of the low molecular weight polystyrene. The table also gives the properties for the composition.

Table II

| Run No. | Starting Materials | | | | | | Product | | | | Molding Pressure | | | | |
|---|---|---|---|---|---|---|---|---|---|---|---|---|---|---|---|
| | High mol. wt. Copolymer of 95% Styrene and 5% rubber, percent | Low mol. wt. Polystyrene | | | | | Tensile Strength, lbs./sq. in. | Elongation, percent | Notched Impact Strength, ft.-lbs. | Heat Distortion Temp., ° C. | 5,000 p. s. i. | 7,000 p. s. i. | 9,000 p. s. i. | 11,000 p. s. i. | 13,000 p. s. i. |
| | | Percent | Volatile, percent | MeOH Soluble, percent | Second Order transition Temp., ° C. | mol. wt. | | | | | Temp., ° F. | Temp., ° F. | Temp., ° F. | Temp., ° F. | Temp., ° F. |
| 1 | 100 | 0 | | 30 | 46 | 19,000 | 4,170 | 19.8 | 2.2 | 74 | 515 | 450 | 420 | 395 | 385 |
| 2 | 80 | 20 | 1.7 | 30 | 46 | 19,000 | 4,660 | 10.0 | 1.5 | 73 | 430 | 385 | 365 | 350 | 345 |
| 3 | 80 | 20 | 3.0 | 21.4 | 48 | 28,000 | 4,510 | 11.3 | 1.6 | 74 | 440 | 395 | 375 | 360 | 350 |
| 4 | 80 | 20 | 1.8 | 11.8 | 64 | 40,000 | 4,500 | 12.7 | 1.4 | 74 | 455 | 410 | 385 | 370 | 360 |

EXAMPLE 5

In each of a series of experiments a composition was prepared by intimately incorporating low molecular weight polystyrene with high molecular weight polystyrene similar to that described in Example 1 and in proportions as stated in the following table. The low molecular weight polystyrene employed in the experiments was prepared by polymerizing monomeric styrene by heating the same in bulk under pressure in a continuous polymerizer for polymerization time and temperature conditions of: 190° C. for 5 minutes; 300°–320° C. for 15 minutes; and 240° C. for 40 minutes, then discharging, cooling and crushing the product to a granular form. The product consisted of about 96 percent by weight of polymer and about 4 percent of volatile ingredients. The polymer was purified by dissolving the product in methyl ethyl ketone to form a solution containing approximately 20 percent by weight of the polymer, pouring the solution into about five times its volume of vigorously agitated methyl alcohol to precipitate the polymer and separating, washing, drying and grinding the precipitated polystyrene to a granular form. The purified low molecular weight polystyrene employed in the experiments contained 0.77 percent by weight of volatile ingredients and 14.28 percent of methanol soluble substances, had a viscosity characteristic of 2.3 centipoises (10 weight percent solution of the polystyrene in toluene at 25° C.), an average molecular weight of 27,000 (light scattering) a second order transition temperature of 64.5° C. and a heat distortion temperature of 72° C. In preparing the compositions, the low molecular weight polystyrene and the high molecular weight polystyrene in powdered or granular form were mixed together in the desired proportions. The mixture was fed to a laboratory plastics extruder wherein it was heat-plastified at temperatures between 375° and 410° F. and mechanically worked, then extruded through a die, cooled and cut to a granular form. Each mixture was passed through the plastics extruder two times. The composition was injection molded to form test bars and to determine its molding characteristics employing procedures similar to those employed in Example 1. Table III identifies the compositions and gives the proportions in percent by weight of the high molecular weight and the low molecular weight polystyrenes employed in preparing the same.

The table also gives the properties determined for the product or composition.

weight copolymer of 65 percent by weight of styrene and 35 percent of alpha-methyl styrene. The copolymer of Table III

| | Starting Materials | | Product | | | | | | | | |
|---|---|---|---|---|---|---|---|---|---|---|---|
| | | | | | | | Molding Pressure | | | | |
| Run No. | High mol. wt. Polystyrene, percent | Low mol. wt. Polystyrene, percent | Tensile Strength, lbs./sq. in. | Elongation, percent | Notched Impact Strength, ft.-lbs. | Heat Distortion Temp., °C. | 5,000 p. s. i. | 7,000 p. s. i. | 9,000 p. s. i. | 11,000 p. s. i. | 13,000 p. s. i. |
| | | | | | | | Temp., °F. | Temp., °F. | Temp., °F. | Temp., °F. | Temp., °F. |
| 1 | 100 | 0 | 7,300 | 2.9 | 0.42 | 86 | 550 | 500 | 470 | 445 | 430 |
| 2 | 95 | 5 | 7,250 | 2.8 | 0.47 | 89 | 540 | 490 | 465 | 440 | 425 |
| 3 | 90 | 10 | 6,995 | 2.7 | 0.46 | 88 | 525 | 480 | 450 | 430 | 415 |
| 4 | 80 | 20 | 5,840 | 2.0 | 0.45 | 86 | 505 | 465 | 440 | 420 | 405 |

EXAMPLE 6

A charge of 1350 grams of a batch of granular molding grade polystyrene containing one percent by weight of white mineral oil as lubricant and 150 grams of granular polyvinyltoluene of low molecular weight were mixed. The mixture was heat-plastified and blended into a uniform composition in a plastics extruder employing procedure similar to that employed in Example 5. The composition was injection molded and tested employing procedures similar to those employed in Example 1. The low molecular weight polyvinyltoluene employed in the experiment contained 2.83 percent by weight of volatile ingredients and 15.35 percent of methanol soluble substances, had a viscosity characteristic of 3.1 centipoises (10 weight percent solution of the polyvinyltoluene in toluene at 25° C.), an average molecular weight of approximately 39,000 and a second order transition temperature of 47° C. The molding grade polystyrene employed in the experiment contained 1.5 percent by weight of volatile ingredients and 3.8 percent of methanol soluble substances, had a viscosity characteristic of 31 centipoises at 25° C., an average molecular weight of 285,000, a second order transition temperature of 72° C. and a heat distortion temperature of 82° C. For purpose of comparison, a portion of the batch of the molding grade polystyrene alone was injection molded and tested employing procedures similar to those employed for the composition of the polystyrene and the low molecular weight polyvinyltoluene. The properties for the polystyrene are reported below under the heading A, and for the composition of the polystyrene and the low molecular weight polyvinyltoluene under the heading B. The properties were:

| | A | B |
|---|---|---|
| Polystyrene percent | 100 | 90 |
| Polyvinyltoluene do | 0 | 10 |
| Tensile Strength lbs./sq. in. | 6,685 | 6,300 |
| Elongation percent | 2.4 | 2.4 |
| Notched Impact Strength ft.-lbs. | 0.41 | 0.39 |
| Heat Distortion Temperature degrees | 82 | 78 |

The flow temperature for the polymeric materials under a molding pressure as stated below was:

| Molding Pressure, lbs./sq. in. | A | B |
|---|---|---|
| | Temperature, °F. | |
| 5,000 | 495 | 475 |
| 7,000 | 450 | 435 |
| 9,000 | 425 | 420 |
| 11,000 | 410 | 405 |
| 13,000 | 400 | 395 |

EXAMPLE 7

A charge of 1260 grams of granular high molecular weight polystyrene similar to that employed in Example 1, was mixed with 140 grams of a granular low molecular weight copolymer of 65 percent by weight of styrene and low molecular weight styrene and alpha-methyl styrene of low molecular weight was prepared by heating a mixture of 65 percent by weight of monomeric styrene and 35 percent of monomeric alpha-methyl styrene in a closed vessel with agitation at a temperature of 170° C. until approximately 50 percent of the monomers were polymerized and withdrawing the solution. The polymer was recovered by rapidly heating the solution to a temperature of 250° C. under pressure and feeding the same into a devolatilizing zone maintained at absolute pressures of from 25 to 30 millimeters wherein the monomers were vaporized, and separately withdrawing the vaporized volatile ingredients and the polymer from said zone. The polymer was cooled and crushed to a granular form. The copolymer of styrene and alpha-methyl styrene employed in the experiment contained 0.54 percent by weight of volatile ingredients and 1.58 percent of methanol soluble substances, had a viscosity characteristic of 4.6 centipoises (10 weight percent solution of the copolymer in toluene at 25° C.), an average molecular weight of approximately 61,000 (light scattering) and a second order transition temperature of 86° C. The mixture of the granular polymeric starting materials was fed into a laboratory plastics extruder wherein it was heat-plastified and blended at temperatures between 375° and 410° F. for a period of about 1½ minutes, then was extruded through a die, cooled and crushed to a granular form. This material was fed to the plastics extruder and blended a second time. A uniform composition was obtained. The product was injection molded and tested employing procedures similar to those employed in Example 1. The composition had the properties:

Tensile strength _____ lbs./sq. in __ 7360
Elongation _____ percent __ 3.4
Notched impact strength _____ ft.-lbs __ 0.42
Heat distortion temperature _____ ° C __ 93

The flow temperature for the product under a molding pressure as stated below was as follows:

| Molding pressure, lbs./sq. in. | Temperature, °F. |
|---|---|
| 5000 | 540 |
| 7000 | 495 |
| 9000 | 470 |
| 11,000 | 495 |
| 13,000 | 430 |

EXAMPLE 8

A charge of 1170 grams of granular molding grade polystyrene similar to that employed in Example 6, and 130 grams of solid particles of polymerized alpha-methyl styrene of low molecular weight were mixed. The mixture was fed to a laboratory plastics extruder wherein it was heat-plastified at temperatures between 375° and 405° F., mechanically worked during passage therethrough for a period of about 1½ minutes, then was extruded through a die, cooled and cut to a granular form. The mixture was passed twice through the extruder. Thereafter it was injection molded and tested employing procedures similar to those employed in Example 1. The low molecular weight homopolymer of alpha-methyl styrene employed in the experiment contained 0.60 percent by weight of volatile ingredients and 11 percent by weight of methanol soluble substances, had an average molecular weight of 1800 and a second order transition temperature of 74° C. The composition had the properties:

Tensile strength_____lbs./sq. in__ 5840
Elongation _____percent__ 2.2
Notched impact strength_____ft.-lbs__ 0.38
Heat distortion temperature_____° C__ 83

The flow temperature for the composition under a molding pressure of 5000 pounds per square inch was 485° F.

EXAMPLE 9

A charge of 1350 grams of granular polystyrene of high molecular weight and similar to that employed in Example 1, and 150 grams of solid particles of polymerized alpha-methyl styrene of low molecular weight were mixed. The mixture was fed to a plastics extruder and blended into a uniform composition employing procedure as described in Example 8. The product was injection molded and tested employing procedures similar to those employed in Example 1. The low molecular weight homopolymer of alpha-methyl styrene employed in the experiment, contained 2.68 percent by weight of volatile ingredients and 34.6 percent of methanol soluble substances, had an average molecular weight of 1150 and a second order transition temperature of 58° C. The product had the properties:

Tensile strength_____lbs./sq. in__ 7010
Elongation _____percent__ 2.8
Notched impact strength_____ft.-lbs__ 0.49
Heat distortion temperature_____°C__ 85

The flow temperature for the product under a molding pressure as stated below was:

| Molding pressure, lbs./sq. in. | Temperature, °F |
|---|---|
| 5,000 | 515 |
| 7,000 | 480 |
| 9,000 | 455 |
| 11,000 | 435 |
| 13,000 | 420 |

EXAMPLE 10

A charge of 780 grams of granular polystyrene of high molecular weight and similar to that employed in Example 1, 300 grams of granular polystyrene of low molecular weight and 420 grams of a rubbery copolymer of 45 percent by weight of butadiene and 55 percent of styrene, which rubbery copolymer contained 0.5 percent by weight of 2,6-di-tertiary-butyl-4-methyl phenol as stabilizer was heat-plastified and mechanically worked in a Banbury mixer at a temperature of about 360° F. for a period of three minutes, then was removed and allowed to cool and cut to a granular form suitable for molding. The composition was injection molded and tested employing procedures similar to those employed in Example 1. The low molecular weight polystyrene employed in the experiment was prepared and purified by procedures similar to those described in Example 5. The low molecular weight polystyrene contained 0.75 percent by weight of volatile ingredients and 14.28 percent of methanol soluble substances, had a viscosity characteristic of 2.45 centipoises (10 weight percent of the polystyrene in toluene at 25° C.), an average molecular weight of 29,000 and a second order transition temperature of 64° C. For purpose of comparison a composition of 780 grams of the polystyrene of high molecular weight and 420 grams of the rubbery copolymer of butadiene and styrene was prepared by compounding the polymeric ingredients with one another in the Banbury mixer for similar time and temperature conditions. This composition was injection molded and tested employing procedures similar to those employed for molding the composition containing the low molecular weight polystyrene. The properties for the composition of the high molecular weight polystyrene and the rubbery copolymer are reported below under the heading A, and for the composition of the high molecular weight polystyrene, the rubbery copolymer and the low molecular weight polystyrene under the heading B. The properties for the compositions were:

|  | A | B |
|---|---|---|
| Tensile Strength_____lbs./sq. in__ | 4,340 | 4,255 |
| Elongation_____percent__ | 26.3 | 17.3 |
| Notched Impact Strength_____ft.-lbs__ | 9.4 | 5.7 |
| Heat Distortion Temperature_____° C__ | 82 | 79 |

The flow temperatures for the compositions under a molding pressure as stated below were:

| Molding Pressure, lbs./sq. in. | A | B |
|---|---|---|
|  | Temperature, ° F. | |
| 5,000 | 630 | 520 |
| 7,000 | 505 | 445 |
| 9,000 | 455 | 415 |
| 11,000 | 420 | 395 |
| 13,000 | 405 | 380 |

We claim:
1. A resinous composition consisting of from 60 to 98 percent by weight of a normally solid thermoplastic alkenyl aromatic resin A selected from the group consisting of (1) a polymerized monovinyl aromatic hydrocarbon of the benzene series, (2) copolymers of at least 60 percent by weight of a monovinyl aromatic hydrocarbon of the benzene series and not more than 40 percent of an alkenyl aromatic hydrocarbon of the benzene series having a single isopropenyl radical directly attached to a carbon atom of the aromatic nucleus and (3) resinous products consisting of from 60 to 98 percent by weight of at least one of the polymers of 1 and 2 and from 40 to 2 percent of a rubbery elastomer which is a member of the group consisting of natural rubber and rubbery copolymers of from 40 to 80 percent by weight of butadiene and from 60 to 20 percent of styrene, the said resin A containing not more than 3 percent by weight of volatile ingredients capable of being vaporized and removed by heating the resin at a temperature of 213° C. at one millimeter absolute pressure for a time of 25 minutes and having an average molecular weight of at least 140,000, as determined by the scattering of light, intimately incorporated with 40 to 2 percent of a normally solid thermoplastic alkenyl aromatic resin B selected from the group consisting of a polymerized monoalkenyl aromatic hydrocarbon of the benzene series having a single ethylenically unsaturated group of the formula $CH_2=CR-$ wherein R represents a member of the group consisting of hydrogen, methyl and ethyl radicals, said group being directly attached to a carbon atom of the benzene nucleus, which resin B contains not more than 3 percent by weight of volatile ingredients capable of being vaporized and removed by heating the resin at a temperature of 213° C. at one millimeter absolute pressure for a time of 25 minutes, is compatible with resin A and has an average molecular weight of not more than one-third as great as the average molecular weight of resin A and has a second order transition temperature at least as high as 45° C. and not more than 5° C. above the second order transition temperature of resin A.

2. A resinous composition according to claim 1, wherein the thermoplastic alkenyl aromatic resins of A and B each contain not more than 2 percent by weight of said volatile ingredients.

3. A resinous composition according to claim 1, wherein the thermoplastic alkenyl aromatic resins of A and B are employed in proportions corresponding to from 80 to 95 percent by weight of said resin A and from 20 to 5 percent of said resin B.

4. A resinous composition according to claim 3, wherein the thermoplastic alkenyl aromatic resin of A is a copolymer of at least 60 percent by weight of styrene and not more than 40 percent of alpha-methyl styrene.

5. A resinous composition according to claim 3, wherein the thermoplastic alkenyl aromatic resin of A is polystyrene and the alkenyl aromatic resin of B is polymerized alpha-methyl styrene having an average molecular weight between 1,000 and 6,000.

6. A resinous composition according to claim 3, wherein the thermoplastic alkenyl aromatic resin of A is polystyrene and the resin of B is polystyrene having an average molecular weight between 10,000 and 60,000.

References Cited in the file of this patent

UNITED STATES PATENTS

| | | |
|---|---|---|
| 2,421,640 | New et al. | June 3, 1947 |
| 2,454,851 | Warner et al. | Nov. 30, 1948 |
| 2,574,439 | Seymour | Nov. 6, 1951 |
| 2,636,867 | Humfeld | Apr. 28, 1953 |

OTHER REFERENCES

Jenckel et al.: Zeit. physikal. Chem.; volume 182A, 1938, pages 361, 368, 369.

UNITED STATES PATENT OFFICE
CERTIFICATE OF CORRECTION

Patent No. 2,864,802                                                            December 16, 1958

Raymond M. Price et al.

It is hereby certified that error appears in the printed specification of the above numbered patent requiring correction and that the said Letters Patent should read as corrected below.

Column 14, line 63, in the table, under "Temperature, $°F.$", for "495" read -- 445 --.

Signed and sealed this 21st day of July 1959.

(SEAL)
Attest:

KARL H. AXLINE                                           ROBERT C. WATSON
Attesting Officer                                        Commissioner of Patents